Figure 1:
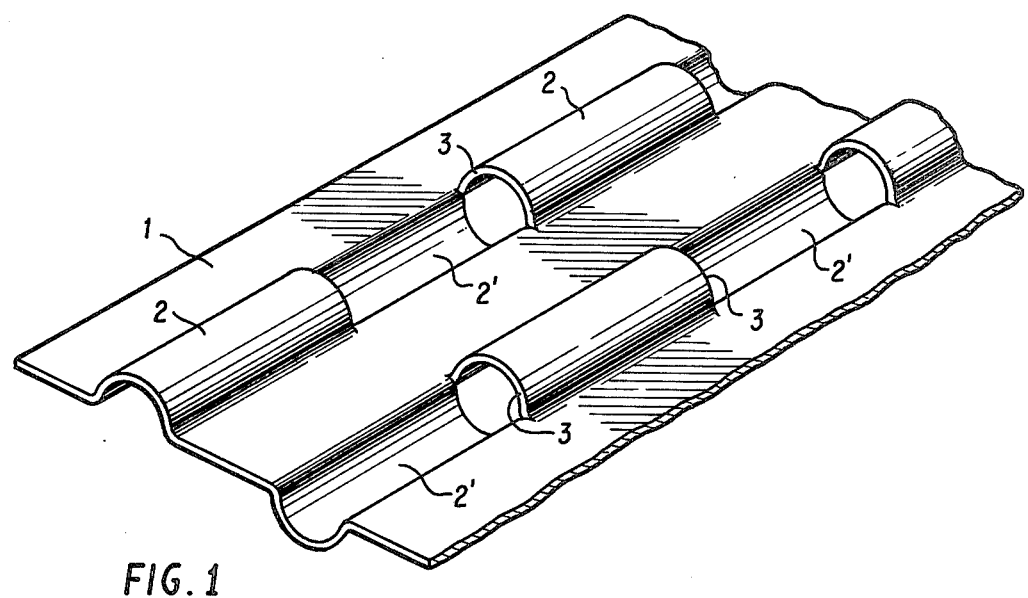

United States Patent [19]

Grossman

[11] 4,182,013

[45] Jan. 8, 1980

[54] METHOD OF CONNECTING METAL TUBES TO METAL SHEETS

[75] Inventor: Gershon Grossman, Haifa, Israel

[73] Assignee: Technion Research & Development Foundation Ltd., Technion City, Israel

[21] Appl. No.: 917,960

[22] Filed: Jun. 22, 1978

[30] Foreign Application Priority Data

Jul. 12, 1977 [IL] Israel ........................................ 52508

[51] Int. Cl.² ............................................. B23P 15/26
[52] U.S. Cl. ........................... 29/157.3 V; 29/157.3 C; 113/118 C; 165/151
[58] Field of Search .................... 29/157.3 A, 157.3 B, 29/157.3 C, 157.3 V; 165/150, 151, 182; 113/118 A, 118 B, 118 C, 118 V

[56] References Cited

U.S. PATENT DOCUMENTS

| | | | |
|---|---|---|---|
| 1,903,125 | 3/1933 | Modine | 165/129 X |
| 2,688,794 | 9/1954 | Malutich | 165/171 X |

FOREIGN PATENT DOCUMENTS

| | | | |
|---|---|---|---|
| 2145092 | 3/1973 | Fed. Rep. of Germany | 165/171 |
| 311111 | 3/1970 | U.S.S.R. | 165/171 |

Primary Examiner—Francis S. Husar
Assistant Examiner—V. K. Rising
Attorney, Agent, or Firm—Robert J. Koch

[57] ABSTRACT

A solar collector panel consists of a metal sheet and a number of straight metal tubes intimately connected to the sheet in order to obtain maximum thermal conductivity. One tube each is connected to a sheet by slotting the latter along a straight line by equidistant parallel short cuts and pressing the areas between two consecutive cuts into semi-cylindrical bulges alternately in opposite direction from the sheet surface. These bulges have a concave semi-circular cross section of a diameter slightly larger than the outer diameter of the tube, and all bulges along the straight line form a continuous passage into which the tube is inserted. After insertion the tube is expanded by mechanical means or by hydraulic pressure and pressed onto the semi-cylindrical portions of the sheet, satisfactory contact being obtained by dimensioning the expanding pressure to a magnitude that the tube material is stressed beyond its yield point, while the sheet metal is stressed below its elastic limit. A suitable number of tubes is, in this manner, connected to a single sheet, and their ends are subsequently connected to form the required water circuit.

8 Claims, 2 Drawing Figures

METHOD OF CONNECTING METAL TUBES TO METAL SHEETS

The invention relates to the connection of metal tubes to metal sheeting in order to form intimate thermal conductive contact between their respective surfaces. It relates more specifically to a method of fabricating metal panels with integrally connected, spaced tubes for solar heat collectors or other heat exchangers.

The most commonly used type of solar collectors consists of an absorber plate made of a heat-conductive metal and having bonded thereto tubes bent or welded into the shape of grids or coils. The absorber plate is tightly enclosed in a heat insulating casing which is provided with a transparent front positioned towards the sun in a manner permitting the absorption of a maximum of solar radiation. It is imperative to provide good bonding between plate and tubes in order to achieve the best possible heat transfer characteristics for the path from the plate through the tube walls to the water flowing in the tubes, and with this object in view several methods have been developed in the past, characteristic representatives of which will be enumerated below.

Connecting the tubes and sheets by means of silver soldering results in an excellent bond but at relatively high production costs; besides, this method often leads to the warping of the plate. Ordinary soft soldering, on the otherhand does not result in warping, but the solder metal is liable to melt whenever the tubes are not filled with water.

A very satisfactory method consists of preforming metal sheets by pressing into them grooves or depressions in the desired shape and connecting two symmetrically formed sheets to one absorber plate by resistance or spot welding. This method however, is suitable for steel sheets only, since neither copper nor aluminium sheets can be welded in this way, and the method is, therefore, only suited to systems involving closed circuits using a non-corrosive liquid.

Simpler method consists of clamping tubes onto sheets which are either flat or provided with semi-circular grooves snugly fitting to the outer tube perimeter. Ordinary pipe clamps are suitably spaced along the tube and press it against the metal sheet. From a cost point-of-view this method is satisfactory, but heat transfer remains mostly poor.

In view of the various drawbacks enumerated it is the object of the present invention to fabricate absorption plates from metal sheets and metal tubes at a low manufacturing cost and to ensure, at the same time, good thermally conductive bonding of the assembled parts.

According to the invention, the method of connecting a straight metal tube to a flat metal sheet along a predetermined axis, comprises the steps of:
  slotting the sheet by a plurality of parallel cuts, spaced apart and symmetrical in respect of, and perpendicular to, the said axis, each cut being of a length not less than the outer diameter of the tube,
  deforming the sheet by pressing the areas between each two consecutive cuts so as to form semi-cylindrical bulges along the said axis projecting out of the sheet plane alternatingly in opposite directions, said bulges having a concave semi-circular cross section of a diameter slightly larger than the outer diameter of said tube,
  inserting said tube axially into the space formed by said alternate bulges, and
  expanding the tube toward the inner bulge surface, the expanding force being dimensioned to stress the tube material beyond its yield point and to stress the surrounding sheet material below its elastic limit.

In a preferred embodiment of a connection of this type the cuts are evenly spaced along the axis. To form an absorption plate the sheet is cut and deformed along several parallel lines in accordance with the number of tubes to be connected. The tubes are preferably longer than the width of the sheet and are, at their ends, connected to headers common to all tubes on one sheet.

It is also possible to connect one narrow sheet to one tube only, resulting in a tube provided with two longitudinal opposedly projecting fins. This type of finned tube is frequently used in solar collectors with staggered absorption plates.

The expansion of the tube is advantageously carried out by means of a mandrel drawn through the tube from one end to the other. Another method consists of closing the ends of the tube, filling the tube with a liquid such as oil or water and applying hydraulic pressure up to the required magnitude.

Figure 2:
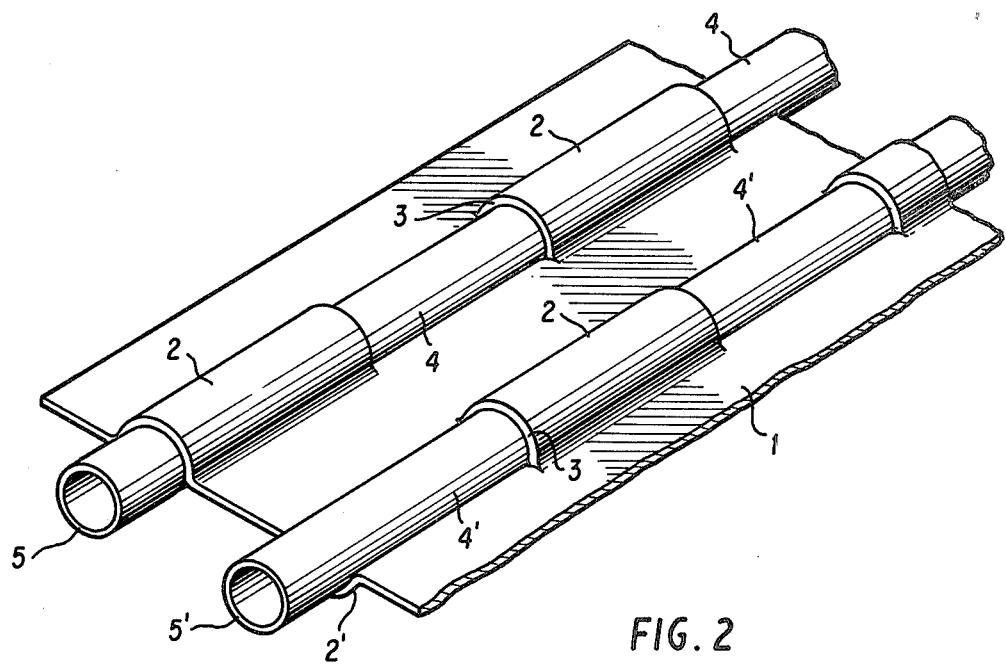

In the accompanying drawing which illustrates, by way of example, one kind of connection between tubes and a sheet according to the invention, FIG. 1 is an isometric view of a portion of an absorption plate before the insertion of tubes, and FIG. 2 illustrates the same plate portion as shown in FIG. 1 with two tubes inserted and expanded therein.

With reference to FIG. 1 of the drawing, an originally flat sheet 1 is provided with a number of relatively short alternating and semi-cylindrical bulges 2 and 2' extending along parallel axes, the bulges 2 projecting in upward direction and the bulges 2' projecting in downward direction, as seen from the sheet's upper surface. The bulges are formed, in accordance with the invention, in that a number of parallel cuts 3 are made, transversely to the said parallel axes and at a distance corresponding to the required length of a bulge, each being of a length not less than the diameter of the tube to be inserted. After cutting, the sheet is placed in a die of a power press, which is provided with alternating semi-cylindrical recesses and projections corresponding to the shape and dimensions of the said bulges, and the bulges are formed by operating the power press and shifting the sheet between strokes, from axis to axis until a complete sheet is shaped as illustrated in FIG. 1.

FIG. 2 shows a portion of the assembled absorption plate wherein two tubes 4 and 4' have been inserted into the cylindrical spaces formed by the alternating bulges. As the drawing shows there is no gap between the bulges and the tubes, the latter having been expanded either by a mandrel of suitable size being drawn through them from end to end or by closing the ends, filling the tubes with a liquid, and applying pressure to the liquid.

Both the mandrel and the liquid pressure are so designed that they serve to expand the tubes toward the surrounding sheet material and continue to expand them together with the latter; however, it is important that the tube is expanded beyond its yield point while the sheet material is only stressed within its elastic limit. This ensures that the sheet material returns to its original shape and closes upon the now-expanded tube in a thermally conducting bond. This operation demands small tolerances between the inner cylinder formed by the bulges, and the tubes, as well as accurate dimensioning of the mandrel diameter.

After being expanded the tube ends 5 and 5' which project beyond the near edge of the sheet, as well as the ends projecting beyond the far edge of the sheet—which latter are not shown in the drawing—are connected to one common header each, in a manner known to the art.

Instead of connecting the tube ends to headers, it is, of course, feasable to connect adjoining tubes by 180° bends to form a serpentine coil. On the other hand, the tubes may be connected to the sheet, along mutually converging rather than parallel axes, and connected at their ends by return bends.

Instead of attaching several tubes to one common sheet, it is equally possible to form a longitudinally finned tube by attaching a tube to one sheet in form of a narow strip, using the aforedescribed mode of connection. This type of tube is advantageously used in forming solar collectors with staggered absorption plates.

In this connection it is pointed out that FIG. 1 shows, for demonstration purposes, the bulges at the edge of the sheet of the two adjoining axes, one to extend in upward (2) and the other (2') in downward direction, and similarly the following bulges in the same row. It is obvious that pressing of the bulges by repeated press strokes with one common tool would result in all rows to have similarly projecting bulges, however FIG. 1 gives a clearer picture of the sheet deformation in the way it has been drawn.

I claim:

1. A method of connecting at least one straight metal tube to a flat metal sheet along a predetermined axis, comprising the steps of:
    slotting the sheet by a plurality of spaced-apart, parallel cuts symmetrical in respect of, and perpendicular to, the said axis, said cuts being of a length not less than the outside diameter of the tube,
    deforming the sheet by pressing the areas between each two consecutive cuts so as to form semicylindrical bulges along the axis alternately projecting out of the sheet plane in opposite directions, said bulges having a concave semicircular cross-section slightly larger than the outer diameter of the said tube,
    inserting said tube into the space formed by said alternate bulges, and
    expanding the tube toward the inner bulge surfaces, the expanding force being dimensioned to stress the tube material beyond its yield point and to stress the surrounding sheet material below its elastic limit.

2. A method of connecting a tube to a sheet as defined in claim 1 where the said cuts are evenly spaced along the said axis.

3. A method of connecting a tube to a sheet as defined in claim 1 comprising the expansion of the tube by means of a mandrel drawn through it from end to end.

4. A method of connecting a tube to a sheet as defined in claim 1 comprising the expansion of the tube by hydraulic pressure.

5. A method of connecting a straight metal tube to a metal sheet as defined in claim 1 adapted to the fabrication of an absorption plate for a solar collector by connecting a predetermined number of tubes to one rectangular sheet in parallel alignment, the length of the tubes being greater than the length of the sheet, and the ends of said tubes projecting beyond the edges of the sheet by a substantially equal length.

6. A method of fabricating an absorption plate for a solar collector as defined in claim 5 comprising connecting the projecting ends of the tubes to one common header at each edge of the sheet.

7. A method of fabricating an absorption plate for a solar collector as defined in claim 5, in which the projecting ends of each two adjoining tubes are connected by a 180° tube bend.

8. A method of connecting a tube to a sheet as defined in claim 1 wherein one straight tube is connected to one strip-shaped metal sheet.

* * * * *